United States Patent
Cronin et al.

(10) Patent No.: US 12,542,038 B2
(45) Date of Patent: Feb. 3, 2026

(54) APPARATUS, METHOD, AND COMPUTER PROGRAM

(71) Applicant: Nokia Technologies Oy, Espoo (FI)

(72) Inventors: Harry Cronin, Cambridge (GB); Christopher Wright, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 128 days.

(21) Appl. No.: 18/488,530

(22) Filed: Oct. 17, 2023

(65) Prior Publication Data

US 2024/0135791 A1 Apr. 25, 2024
US 2024/0233500 A9 Jul. 11, 2024

(30) Foreign Application Priority Data

Oct. 24, 2022 (EP) .................................. 22203217

(51) Int. Cl.
*H04B 3/36* (2006.01)
*G06F 21/32* (2013.01)
*G08B 6/00* (2006.01)

(52) U.S. Cl.
CPC .............. *G08B 6/00* (2013.01); *G06F 21/32* (2013.01)

(58) Field of Classification Search
CPC ........... G08B 6/00; G06F 21/32; G06F 21/34; H04B 13/005; H04L 63/0838; H04L 63/0861
See application file for complete search history.

(56) References Cited

U.S. PATENT DOCUMENTS

| | | | |
|---|---|---|---|
| 8,279,053 B2* | 10/2012 | Ryu ................... | H04M 19/04 340/407.1 |
| 9,949,124 B1 | 4/2018 | Chen | |
| 10,255,738 B1 | 4/2019 | Fernandez et al. | |
| 10,825,245 B1* | 11/2020 | Ramasamy ............ | G06V 40/19 |
| 11,754,592 B1* | 9/2023 | Bechhoefer .......... | G01P 15/097 702/69 |
| 2010/0066664 A1 | 3/2010 | Son et al. | |
| 2012/0184877 A1 | 7/2012 | Garcia Morchon et al. | |
| 2013/0142363 A1 | 6/2013 | Amento et al. | |
| 2015/0137936 A1 | 5/2015 | Baldwin et al. | |
| 2015/0310845 A1* | 10/2015 | Chan ................ | G10K 11/17873 381/71.8 |
| 2017/0323500 A1 | 11/2017 | Baldwin et al. | |
| 2018/0019994 A1 | 1/2018 | Chang et al. | |
| 2019/0182371 A1* | 6/2019 | Ashall ............... | H04M 1/72469 |
| 2021/0374399 A1 | 12/2021 | Cheung et al. | |
| 2022/0004730 A1 | 1/2022 | Wright et al. | |

OTHER PUBLICATIONS

"Giving Off Good Vibes", Hackster, Retrieved on Dec. 4, 2023, Webpage available at : https://www.hackster.io/news/giving-off-good-vibes-f016468385ef.

(Continued)

*Primary Examiner* — Toan N Pham
(74) *Attorney, Agent, or Firm* — ALSTON & BIRD LLP

(57) ABSTRACT

The disclosure relates to an apparatus comprising means for: generating (500) a vibrational signal comprising data to be conveyed to another apparatus; modifying (502) the vibrational signal based on a user biometric model; and outputting (504) the modified vibrational signal.

15 Claims, 6 Drawing Sheets

(56) References Cited

OTHER PUBLICATIONS

"ORII Smart Ring Turns Your Finger into Earbuds", Wearable Technologies, Retrieved on Dec. 4, 2023, Webpage available at : https://wt-obk.wearable-technologies.com/2018/09/orii-smart-ring-turns-your-finger-into-earbuds/.

Sim et al., "Identity Recognition Based on Bioacoustics of Human Body", IEEE Transactions on Cybernetics, vol. 51, No. 5, May 2021, pp. 2761-2772.

Lee et al., "Usable User Authentication on a Smartwatch using Vibration", ACM SIGSAC Conference on Computer and Communications Security, Nov. 15-19, 2021, pp. 304-319.

Xu et al., "TouchPass: towards behavior-irrelevant on-touch user authentication on smartphones leveraging vibrations", The 26th Annual International Conference on Mobile Computing and Networking, Sep. 21-25, 2020, 13 pages.

"TechScape: Apple, Google and Microsoft are about to make passwords a thing of the past", The Guardian, Retrieved on Dec. 4, 2023, Webpage available at : https://www.theguardian.com/technology/2022/may/11/techscape-fido-passwords.

"Introducing One-Time Passwords", Klarna, Retrieved on Dec. 4, 2023, Webpage available at : https://www.klarna.com/uk/blog/introducing-one-time passwords/.

Kim et al., "SmartGrip: grip sensing system for commodity mobile devices through sound signals", Personal and Ubiquitous Computing, Oct. 11, 2019, 12 pages.

Kim et al., "Transferring Data from Smartwatch to Smartphone through Mechanical Wave Propagation", Sensors, Aug. 28, 2015, 14 pages.

Extended European Search Report received for corresponding European Patent Application No. 22203217.9, Mar. 1, 2023, 7 pages.

\* cited by examiner

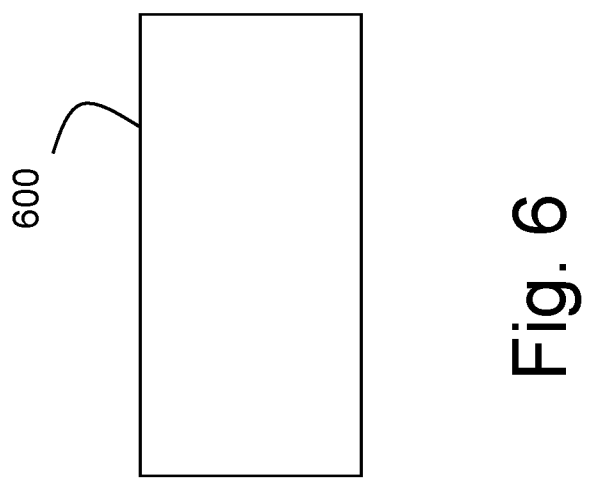

APPARATUS, METHOD, AND COMPUTER PROGRAM

RELATED APPLICATION

This application claims priority to European Patent Application No. 22203217.9, filed Oct. 24, 2022, which is incorporated herein by reference in its entirety.

FIELD OF THE DISCLOSURE

The present disclosure relates to an apparatus, a method, and a computer program for outputting a modified vibrational signal based on a user biometric model.

SUMMARY

According to an aspect there is provided an apparatus comprising means for: generating a vibrational signal comprising data to be conveyed to another apparatus; modifying the vibrational signal based on a user biometric model; and outputting the modified vibrational signal.

Generating the vibrational signal conveying data may comprise: obtaining data; and modulating and/or encoding the data into the vibrational signal.

Modifying the vibrational signal based on a user biometric model may comprise: modifying an amplitude and/or a frequency spectrum of the vibrational signal.

The data may comprises a first data type and a second data type; and modifying the vibrational signal based on a user biometric model may comprise: modifying a part of the vibrational signal conveying the first data type based on a user biometric model; and not modifying another part of the vibrational signal conveying the second data type based on a user biometric model.

The first data type may contain pre-check information.

The second data type may contain payload information.

The data may comprise a second data type; and modifying the vibrational signal based on a user biometric model may comprise: modifying a part of the vibrational signal conveying the second data type based on a user biometric model.

The user biometric model may be a frequency response function with one or more areas of low attenuation and one or more areas of high attenuation.

Modifying the vibrational signal based on a user biometric model may comprise: selecting all frequency bands of the vibrational signal for outputting all frequency bands of the vibrational signal; and reducing the amplitude of one or more frequency bands of the vibrational signal corresponding to the one or more areas of low attenuation.

Reducing the amplitude of one or more frequency bands of the vibrational signal corresponding to the one or more areas of low attenuation may comprise only reducing the amplitude of the one or more frequency bands of the vibrational signal corresponding to the one or more areas of low attenuation.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The apparatus may comprise means for: receiving the user biometric model; or building the user biometric model.

Building the user biometric model may comprise: sending a calibration vibrational signal to the other apparatus while the user grips the apparatus and touches the other apparatus; receiving feedback from the other apparatus including a vibrational signal received by the other apparatus; and comparing the calibration vibrational signal to the vibrational signal received by the other apparatus to build the user biometric model.

Building the user biometric model may comprise: sending a calibration vibrational signal while the user grips the apparatus and touches a solid object; and receiving a vibrational signal reflected by the solid object; and comparing the calibration vibrational signal to the vibrational signal reflected by the solid object to build the user biometric model.

Building the user biometric model may comprise: sending a calibration vibrational signal while the user places the apparatus on a solid surface and while the user grips and subsequently releases the apparatus; and receiving a vibrational signal reflected by the solid surface; and comparing the calibration vibrational signal to the vibrational signal reflected by the solid surface to build the user biometric model.

Building the user biometric model may comprise: instructing the user to adjust the grip and/or change the finger used to touch the other apparatus or solid object.

The apparatus may comprise means for: determining whether the user is touching the other apparatus with a first finger configuration or a second finger configuration and/or whether the user is using a first grip or a second grip while the modified vibrational signal was sent to the other apparatus; and taking a first action when the user touched the other apparatus with the first finger configuration or used the first grip and a second action when the user touched the other apparatus with the second finger configuration or used the second grip.

A finger configuration may comprise one or more fingers.

The apparatus may comprise means for: modifying the vibrational signal based on a first user biometric model associated with the first finger configuration or first grip; sending the modified vibrational signal to another apparatus; modifying the vibrational signal based on a second user biometric model associated with the second finger configuration or second grip; resending the modified vibrational signal to the other apparatus; determining that the other apparatus took an action; and determining whether the user touched the other apparatus with the first finger configuration or the second finger configuration or whether the user used a first grip or a second grip while the modified vibrational signal was sent to the other apparatus based on whether the other apparatus took the action after the vibrational signal was modified based on the first user biometric model and the modified vibrational signal was sent or after the vibrational signal was modified based on the second user biometric model and the modified vibrational signal was sent.

The apparatus may comprise means for: receiving a feedback from the other apparatus indicating whether the user touched the other apparatus with the first finger configuration or the second finger configuration while the modified vibrational signal was received by the other apparatus.

The apparatus may comprise means for: determining the likelihood that the modified vibrational signal has been received by the other apparatus based on: an amplitude of the modified vibrational signal sent by the apparatus, an amplitude of the modified vibrational signal received by the other apparatus, and the user biometric model.

The apparatus may comprise means for: determining that the likelihood that the modified vibrational signal has been received by the other apparatus is lower or greater than a threshold; modifying the vibrational signal based on the user biometric model to increase or decrease the likelihood that the modified vibrational signal will be received by the other apparatus based on the determination; and re-outputting the modified vibrational signal to the other apparatus.

The apparatus may comprise means for: instructing a user to adjust a current grip or change a current finger configuration touching the other apparatus so that the current grip or current finger is the same as a previous grip or previous finger used to build the user biometric model.

The apparatus may comprise means for: determining that the current grip or current finger configuration touching the other apparatus is different from the previous grip or the previous finger configuration used to build the user biometric model.

The apparatus may be holdable or wearable by a user.

The apparatus may comprise a vibration motor configured to send the modified vibrational signal; and the other apparatus may comprise a microphone and/or an accelerometer configured to receive the modified vibrational signal.

According to an aspect there is provided an apparatus comprising at least one processor and at least one memory including computer code for one or more programs, the at least one memory and the computer code configured, with the at least one processor, to cause the apparatus at least to: generate a vibrational signal comprising data to be conveyed to another apparatus; modify the vibrational signal based on a user biometric model; and output the modified vibrational signal.

Generating the vibrational signal conveying data may comprise: obtaining data; and modulating and/or encoding the data into the vibrational signal.

Modifying the vibrational signal based on a user biometric model may comprise: modifying an amplitude and/or a frequency spectrum of the vibrational signal.

The data may comprises a first data type and a second data type; and modifying the vibrational signal based on a user biometric model may comprise: modifying a part of the vibrational signal conveying the first data type based on a user biometric model; and not modifying another part of the vibrational signal conveying the second data type based on a user biometric model.

The first data type may contain pre-check information.

The second data type may contain payload information.

The data may comprise a second data type; and modifying the vibrational signal based on a user biometric model may comprise: modifying a part of the vibrational signal conveying the second data type based on a user biometric model.

The user biometric model may be a frequency response function with one or more areas of low attenuation and one or more areas of high attenuation.

Modifying the vibrational signal based on a user biometric model may comprise: selecting all frequency bands of the vibrational signal for outputting all frequency bands of the vibrational signal; and reducing the amplitude of one or more frequency bands of the vibrational signal corresponding to the one or more areas of low attenuation.

Reducing the amplitude of one or more frequency bands of the vibrational signal corresponding to the one or more areas of low attenuation may comprise only reducing the amplitude of the one or more frequency bands of the vibrational signal corresponding to the one or more areas of low attenuation.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The at least one memory and the computer code may be configured, with the at least one processor, to cause the apparatus at least to: receive the user biometric model; or building the user biometric model.

Building the user biometric model may comprise: sending a calibration vibrational signal to the other apparatus while the user grips the apparatus and touches the other apparatus; receiving feedback from the other apparatus including a vibrational signal received by the other apparatus; and comparing the calibration vibrational signal to the vibrational signal received by the other apparatus to build the user biometric model.

Building the user biometric model may comprise: sending a calibration vibrational signal while the user grips the apparatus and touches a solid object; and receiving a vibrational signal reflected by the solid object; and comparing the calibration vibrational signal to the vibrational signal reflected by the solid object to build the user biometric model.

Building the user biometric model may comprise: sending a calibration vibrational signal while the user places the apparatus on a solid surface and while the user grips and subsequently releases the apparatus; and receiving a vibrational signal reflected by the solid surface; and comparing the calibration vibrational signal to the vibrational signal reflected by the solid surface to build the user biometric model.

Building the user biometric model may comprise: instructing the user to adjust the grip and/or change the finger used to touch the other apparatus or solid object.

The at least one memory and the computer code may be configured, with the at least one processor, to cause the apparatus at least to: determine whether the user is touching the other apparatus with a first finger configuration or a second finger configuration and/or whether the user is using a first grip or a second grip while the modified vibrational signal was sent to the other apparatus; and take a first action when the user touched the other apparatus with the first finger configuration or used the first grip and a second action when the user touched the other apparatus with the second finger configuration or used the second grip.

A finger configuration may comprise one or more fingers.

The at least one memory and the computer code may be configured, with the at least one processor, to cause the apparatus at least to: modify the vibrational signal based on a first user biometric model associated with the first finger configuration or first grip; send the modified vibrational signal to another apparatus; modifying the vibrational signal based on a second user biometric model associated with the second finger configuration or second grip; resend the modified vibrational signal to the other apparatus; determining that the other apparatus took an action; and determine whether the user touched the other apparatus with the first finger configuration or the second finger configuration or whether the user used a first grip or a second grip while the modified vibrational signal was sent to the other apparatus based on whether the other apparatus took the action after the vibrational signal was modified based on the first user biometric model and the modified vibrational signal was sent or after the vibrational signal was modified based on the second user biometric model and the modified vibrational signal was sent.

The at least one memory and the computer code may be configured, with the at least one processor, to cause the apparatus at least to: receive a feedback from the other apparatus indicating whether the user touched the other apparatus with the first finger configuration or the second finger configuration while the modified vibrational signal was received by the other apparatus.

The at least one memory and the computer code may be configured, with the at least one processor, to cause the apparatus at least to: determine the likelihood that the modified vibrational signal has been received by the other apparatus based on: an amplitude of the modified vibrational signal sent by the apparatus, an amplitude of the modified vibrational signal received by the other apparatus, and the user biometric model.

The at least one memory and the computer code may be configured, with the at least one processor, to cause the apparatus at least to: determine that the likelihood that the modified vibrational signal has been received by the other apparatus is lower or greater than a threshold; modify the vibrational signal based on the user biometric model to increase or decrease the likelihood that the modified vibrational signal will be received by the other apparatus based on the determination; and re-output the modified vibrational signal to the other apparatus.

The at least one memory and the computer code may be configured, with the at least one processor, to cause the apparatus at least to: instruct a user to adjust a current grip or change a current finger configuration touching the other apparatus so that the current grip or current finger is the same as a previous grip or previous finger used to build the user biometric model.

The at least one memory and the computer code may be configured, with the at least one processor, to cause the apparatus at least to: determine that the current grip or current finger configuration touching the other apparatus is different from the previous grip or the previous finger configuration used to build the user biometric model.

The apparatus may be holdable or wearable by a user.

The apparatus may comprise a vibration motor configured to send the modified vibrational signal; and the other apparatus may comprise a microphone and/or an accelerometer configured to receive the modified vibrational signal.

According to an aspect there is provided an apparatus comprising circuitry configured to: generate a vibrational signal comprising data to be conveyed to another apparatus; modify the vibrational signal based on a user biometric model; and output the modified vibrational signal.

Generating the vibrational signal conveying data may comprise: obtaining data; and modulating and/or encoding the data into the vibrational signal.

Modifying the vibrational signal based on a user biometric model may comprise: modifying an amplitude and/or a frequency spectrum of the vibrational signal.

The data may comprises a first data type and a second data type; and modifying the vibrational signal based on a user biometric model may comprise: modifying a part of the vibrational signal conveying the first data type based on a user biometric model; and not modifying another part of the vibrational signal conveying the second data type based on a user biometric model.

The first data type may contain pre-check information.

The second data type may contain payload information.

The data may comprise a second data type; and modifying the vibrational signal based on a user biometric model may comprise: modifying a part of the vibrational signal conveying the second data type based on a user biometric model.

The user biometric model may be a frequency response function with one or more areas of low attenuation and one or more areas of high attenuation.

Modifying the vibrational signal based on a user biometric model may comprise: selecting all frequency bands of the vibrational signal for outputting all frequency bands of the vibrational signal; and reducing the amplitude of one or more frequency bands of the vibrational signal corresponding to the one or more areas of low attenuation.

Reducing the amplitude of one or more frequency bands of the vibrational signal corresponding to the one or more areas of low attenuation may comprise only reducing the amplitude of the one or more frequency bands of the vibrational signal corresponding to the one or more areas of low attenuation.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The apparatus may comprise circuitry configured to: receive the user biometric model; or building the user biometric model.

Building the user biometric model may comprise: sending a calibration vibrational signal to the other apparatus while the user grips the apparatus and touches the other apparatus; receiving feedback from the other apparatus including a vibrational signal received by the other apparatus; and comparing the calibration vibrational signal to the vibrational signal received by the other apparatus to build the user biometric model.

Building the user biometric model may comprise: sending a calibration vibrational signal while the user grips the apparatus and touches a solid object; and receiving a vibrational signal reflected by the solid object; and comparing the calibration vibrational signal to the vibrational signal reflected by the solid object to build the user biometric model.

Building the user biometric model may comprise: sending a calibration vibrational signal while the user places the apparatus on a solid surface and while the user grips and subsequently releases the apparatus; and receiving a vibrational signal reflected by the solid surface; and comparing the calibration vibrational signal to the vibrational signal reflected by the solid surface to build the user biometric model.

Building the user biometric model may comprise: instructing the user to adjust the grip and/or change the finger used to touch the other apparatus or solid object.

The apparatus may comprise circuitry configured to: determine whether the user is touching the other apparatus with a first finger configuration or a second finger configuration and/or whether the user is using a first grip or a second grip while the modified vibrational signal was sent to the other apparatus; and take a first action when the user touched the other apparatus with the first finger configuration or used the first grip and a second action when the user touched the other apparatus with the second finger configuration or used the second grip.

A finger configuration may comprise one or more fingers.

The apparatus may comprise circuitry configured to: modify the vibrational signal based on a first user biometric model associated with the first finger configuration or first grip; send the modified vibrational signal to another apparatus; modifying the vibrational signal based on a second user biometric model associated with the second finger configuration or second grip; resend the modified vibrational signal to the other apparatus; determining that the other apparatus took an action; and determine whether the user touched the other apparatus with the first finger configuration or the second finger configuration or whether the user used a first grip or a second grip while the modified vibrational signal was sent to the other apparatus based on whether the other apparatus took the action after the vibrational signal was modified based on the first user biometric model and the modified vibrational signal was sent or after the vibrational signal was modified based on the second user biometric model and the modified vibrational signal was sent.

The apparatus may comprise circuitry configured to: receive a feedback from the other apparatus indicating whether the user touched the other apparatus with the first finger configuration or the second finger configuration while the modified vibrational signal was received by the other apparatus.

The apparatus may comprise circuitry configured to: determine the likelihood that the modified vibrational signal has been received by the other apparatus based on: an amplitude of the modified vibrational signal sent by the apparatus, an amplitude of the modified vibrational signal received by the other apparatus, and the user biometric model.

The apparatus may comprise circuitry configured to: determine that the likelihood that the modified vibrational signal has been received by the other apparatus is lower or greater than a threshold; modify the vibrational signal based on the user biometric model to increase or decrease the likelihood that the modified vibrational signal will be received by the other apparatus based on the determination; and re-output the modified vibrational signal to the other apparatus.

The apparatus may comprise circuitry configured to: instruct a user to adjust a current grip or change a current finger configuration touching the other apparatus so that the current grip or current finger is the same as a previous grip or previous finger used to build the user biometric model.

The apparatus may comprise circuitry configured to: determine that the current grip or current finger configuration touching the other apparatus is different from the previous grip or the previous finger configuration used to build the user biometric model.

The apparatus may be holdable or wearable by a user.

The apparatus may comprise a vibration motor configured to send the modified vibrational signal; and the other apparatus may comprise a microphone and/or an accelerometer configured to receive the modified vibrational signal.

According to an aspect there is provided a method comprising: generating a vibrational signal comprising data to be conveyed to another apparatus; modifying the vibrational signal based on a user biometric model; and outputting the modified vibrational signal.

The method may be performed by an apparatus.

Generating the vibrational signal conveying data may comprise: obtaining data; and modulating and/or encoding the data into the vibrational signal.

Modifying the vibrational signal based on a user biometric model may comprise: modifying an amplitude and/or a frequency spectrum of the vibrational signal.

The data may comprises a first data type and a second data type; and modifying the vibrational signal based on a user biometric model may comprise: modifying a part of the vibrational signal conveying the first data type based on a user biometric model; and not modifying another part of the vibrational signal conveying the second data type based on a user biometric model.

The first data type may contain pre-check information.

The second data type may contain payload information.

The data may comprise a second data type; and modifying the vibrational signal based on a user biometric model may comprise: modifying a part of the vibrational signal conveying the second data type based on a user biometric model.

The user biometric model may be a frequency response function with one or more areas of low attenuation and one or more areas of high attenuation.

Modifying the vibrational signal based on a user biometric model may comprise: selecting all frequency bands of the vibrational signal for outputting all frequency bands of the vibrational signal; and reducing the amplitude of one or more frequency bands of the vibrational signal corresponding to the one or more areas of low attenuation.

Reducing the amplitude of one or more frequency bands of the vibrational signal corresponding to the one or more areas of low attenuation may comprise only reducing the amplitude of the one or more frequency bands of the vibrational signal corresponding to the one or more areas of low attenuation.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The method may comprise: receiving the user biometric model; or building the user biometric model.

Building the user biometric model may comprise: sending a calibration vibrational signal to the other apparatus while the user grips the apparatus and touches the other apparatus; receiving feedback from the other apparatus including a vibrational signal received by the other apparatus; and comparing the calibration vibrational signal to the vibrational signal received by the other apparatus to build the user biometric model.

Building the user biometric model may comprise: sending a calibration vibrational signal while the user grips the apparatus and touches a solid object; and receiving a vibrational signal reflected by the solid object; and comparing the calibration vibrational signal to the vibrational signal reflected by the solid object to build the user biometric model.

Building the user biometric model may comprise: sending a calibration vibrational signal while the user places the apparatus on a solid surface and while the user grips and subsequently releases the apparatus; and receiving a vibrational signal reflected by the solid surface; and comparing the calibration vibrational signal to the vibrational signal reflected by the solid surface to build the user biometric model.

Building the user biometric model may comprise: instructing the user to adjust the grip and/or change the finger used to touch the other apparatus or solid object.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The method may comprise: determining whether the user is touching the other apparatus with a first finger configuration or a second finger configuration and/or whether the user is using a first grip or a second grip while the modified vibrational signal was sent to the other apparatus; and taking a first action when the user touched the other apparatus with the first finger configuration or used the first grip and a second action when the user touched the other apparatus with the second finger configuration or used the second grip.

A finger configuration may comprise one or more fingers.

The method may comprise: modifying the vibrational signal based on a first user biometric model associated with the first finger configuration or first grip; sending the modified vibrational signal to another apparatus; modifying the vibrational signal based on a second user biometric model associated with the second finger configuration or second grip; resending the modified vibrational signal to the other apparatus; determining that the other apparatus took an action; and determining whether the user touched the other apparatus with the first finger configuration or the second finger configuration or whether the user used a first grip or a second grip while the modified vibrational signal was sent to the other apparatus based on whether the other apparatus took the action after the vibrational signal was modified based on the first user biometric model and the modified vibrational signal was sent or after the vibrational signal was modified based on the second user biometric model and the modified vibrational signal was sent.

The method may comprise: receiving a feedback from the other apparatus indicating whether the user touched the other apparatus with the first finger configuration or the second finger configuration while the modified vibrational signal was received by the other apparatus.

The method may comprise: determining the likelihood that the modified vibrational signal has been received by the other apparatus based on: an amplitude of the modified vibrational signal sent by the apparatus, an amplitude of the modified vibrational signal received by the other apparatus, and the user biometric model.

The method may comprise: determining that the likelihood that the modified vibrational signal has been received by the other apparatus is lower or greater than a threshold; modifying the vibrational signal based on the user biometric model to increase or decrease the likelihood that the modified vibrational signal will be received by the other apparatus based on the determination; and re-outputting the modified vibrational signal to the other apparatus.

The method may comprise: instructing a user to adjust a current grip or change a current finger configuration touching the other apparatus so that the current grip or current finger is the same as a previous grip or previous finger used to build the user biometric model.

The method may comprise: determining that the current grip or current finger configuration touching the other apparatus is different from the previous grip or the previous finger configuration used to build the user biometric model.

The apparatus may be holdable or wearable by a user.

The apparatus may comprise a vibration motor configured to send the modified vibrational signal; and the other apparatus may comprise a microphone and/or an accelerometer configured to receive the modified vibrational signal.

According to an aspect there is provided a computer program comprising computer executable code which when run on at least one processor is configured to: generate a vibrational signal comprising data to be conveyed to another apparatus; modify the vibrational signal based on a user biometric model; and output the modified vibrational signal.

The at least one processor may be part of an apparatus

Generating the vibrational signal conveying data may comprise: obtaining data; and modulating and/or encoding the data into the vibrational signal.

Modifying the vibrational signal based on a user biometric model may comprise: modifying an amplitude and/or a frequency spectrum of the vibrational signal.

The data may comprises a first data type and a second data type; and modifying the vibrational signal based on a user biometric model may comprise: modifying a part of the vibrational signal conveying the first data type based on a user biometric model; and not modifying another part of the vibrational signal conveying the second data type based on a user biometric model.

The first data type may contain pre-check information.

The second data type may contain payload information.

The data may comprise a second data type; and modifying the vibrational signal based on a user biometric model may comprise: modifying a part of the vibrational signal conveying the second data type based on a user biometric model.

The user biometric model may be a frequency response function with one or more areas of low attenuation and one or more areas of high attenuation.

Modifying the vibrational signal based on a user biometric model may comprise: selecting all frequency bands of the vibrational signal for outputting all frequency bands of the vibrational signal; and reducing the amplitude of one or more frequency bands of the vibrational signal corresponding to the one or more areas of low attenuation.

Reducing the amplitude of one or more frequency bands of the vibrational signal corresponding to the one or more areas of low attenuation may comprise only reducing the amplitude of the one or more frequency bands of the vibrational signal corresponding to the one or more areas of low attenuation.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The computer program may comprise computer executable code which when run on at least one processor is configured to: receive the user biometric model; or building the user biometric model.

Building the user biometric model may comprise: sending a calibration vibrational signal to the other apparatus while the user grips the apparatus and touches the other apparatus; receiving feedback from the other apparatus including a vibrational signal received by the other apparatus; and comparing the calibration vibrational signal to the vibrational signal received by the other apparatus to build the user biometric model.

Building the user biometric model may comprise: sending a calibration vibrational signal while the user grips the apparatus and touches a solid object; and receiving a vibrational signal reflected by the solid object; and comparing the calibration vibrational signal to the vibrational signal reflected by the solid object to build the user biometric model.

Building the user biometric model may comprise: sending a calibration vibrational signal while the user places the apparatus on a solid surface and while the user grips and subsequently releases the apparatus; and receiving a vibrational signal reflected by the solid surface; and comparing the calibration vibrational signal to the vibrational signal reflected by the solid surface to build the user biometric model.

Building the user biometric model may comprise: instructing the user to adjust the grip and/or change the finger used to touch the other apparatus or solid object.

The computer program may comprise computer executable code which when run on at least one processor is configured to: determine whether the user is touching the other apparatus with a first finger configuration or a second finger configuration and/or whether the user is using a first grip or a second grip while the modified vibrational signal was sent to the other apparatus; and take a first action when the user touched the other apparatus with the first finger configuration or used the first grip and a second action when the user touched the other apparatus with the second finger configuration or used the second grip.

A finger configuration may comprise one or more fingers.

The computer program may comprise computer executable code which when run on at least one processor is configured to: modify the vibrational signal based on a first user biometric model associated with the first finger configuration or first grip; send the modified vibrational signal to another apparatus; modifying the vibrational signal based on a second user biometric model associated with the second finger configuration or second grip; resend the modified vibrational signal to the other apparatus; determining that the other apparatus took an action; and determine whether the user touched the other apparatus with the first finger configuration or the second finger configuration or whether the user used a first grip or a second grip while the modified vibrational signal was sent to the other apparatus based on whether the other apparatus took the action after the vibrational signal was modified based on the first user biometric model and the modified vibrational signal was sent or after the vibrational signal was modified based on the second user biometric model and the modified vibrational signal was sent.

The computer program may comprise computer executable code which when run on at least one processor is configured to: receive a feedback from the other apparatus indicating whether the user touched the other apparatus with the first finger configuration or the second finger configuration while the modified vibrational signal was received by the other apparatus.

The computer program may comprise computer executable code which when run on at least one processor is configured to: determine the likelihood that the modified vibrational signal has been received by the other apparatus based on: an amplitude of the modified vibrational signal sent by the apparatus, an amplitude of the modified vibrational signal received by the other apparatus, and the user biometric model.

The computer program may comprise computer executable code which when run on at least one processor is configured to: determine that the likelihood that the modified vibrational signal has been received by the other apparatus is lower or greater than a threshold; modify the vibrational signal based on the user biometric model to increase or decrease the likelihood that the modified vibrational signal will be received by the other apparatus based on the determination; and re-output the modified vibrational signal to the other apparatus.

The computer program may comprise computer executable code which when run on at least one processor is configured to: instruct a user to adjust a current grip or change a current finger configuration touching the other apparatus so that the current grip or current finger is the same as a previous grip or previous finger used to build the user biometric model.

The computer program may comprise computer executable code which when run on at least one processor is configured to: determine that the current grip or current finger configuration touching the other apparatus is different from the previous grip or the previous finger configuration used to build the user biometric model.

The apparatus may be holdable or wearable by a user.

The apparatus may comprise a vibration motor configured to send the modified vibrational signal; and the other apparatus may comprise a microphone and/or an accelerometer configured to receive the modified vibrational signal.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

IoT: Internet of Things
MS: Mobile Station
MTC: Machine Type Communication
OTP: One Time Password
RAM: Random Access Memory
(R)AN: (Radio) Access Network
ROM: Read Only Memory
UE: User Equipment

BRIEF DESCRIPTION OF THE FIGURES

FIG. 6 shows a schematic representation of a non-volatile memory medium storing instructions which when executed by a processor allow a processor to perform one or more of the steps of the method of FIG. 5.

DETAILED DESCRIPTION OF THE FIGS.

Figure 1:
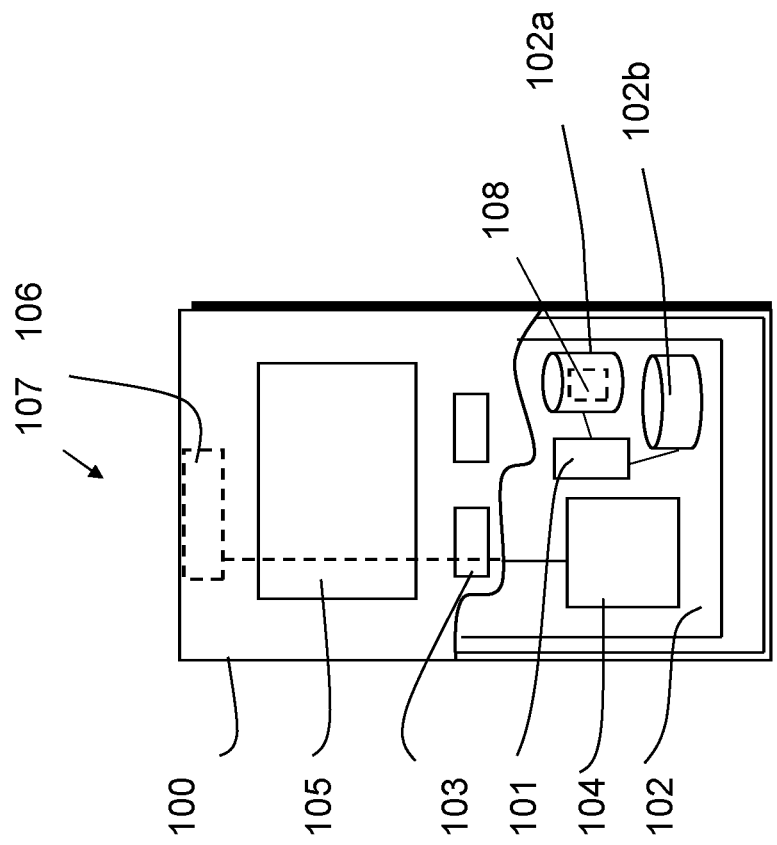
FIG. 1 shows a schematic representation of a user equipment.

FIG. 1 illustrates an example of a User Equipment (UE) 100. The UE 100 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dangle), a personal data assistant (PDA) or a tablet provided with wireless communication capabilities, a machine-type communications (MTC) device, a Cellular Internet of things (CIoT) device, a smart ring, a smart watch, a smart speaker or any combinations of these or the like. The UE 100 may provide, for example, communication of data for carrying communications. The communications may be one or more of voice, electronic mail (email), text message, multimedia, data, machine data and so on.

The UE 100 may receive signals over an air or radio interface 107 via appropriate apparatus for receiving and may transmit signals via appropriate apparatus for transmitting radio signals. In FIG. 1 transceiver apparatus is designated schematically by block 106. The transceiver apparatus 106 may be provided for example by means of a radio part and associated antenna arrangement. The antenna arrangement may be arranged internally or externally to the mobile device.

The UE 300 may be provided with at least one processor 101, at least one memory ROM 102a, at least one RAM 102b and other possible components 103 for use in software and hardware aided execution of tasks it is designed to perform, including control of access to and communications with access systems and other communication devices. The at least one processor 101 is coupled to the RAM 102b and the ROM 102a. The at least one processor 101 may be configured to execute an appropriate software code 108. The software code 108 may for example allow to perform one or more of the present aspects. The software code 108 may be stored in the ROM 102a.

The processor, storage and other relevant control apparatus can be provided on an appropriate circuit board and/or in chipsets. This feature is denoted by reference 104. The device may optionally have a user interface such as keypad 105, touch sensitive screen or pad, combinations thereof or the like. Optionally one or more of a display, a speaker and a microphone may be provided depending on the type of the device.

One or more aspects of this disclosure relates to techniques for sending a vibrational signal.

Techniques for outputting a vibrational signal, wherein the vibrational data comprises data (e.g. audio data) to be conveyed from a primary UE (e.g. smart phone) to a secondary UE (e.g. speaker) through a user's hand and/or finger are known. The primary UE may comprise a vibration motor for sending the vibrational signal. The secondary UE may comprise an accelerometer or a microphone for receiving the vibrational signal.

Similar techniques for outputting a vibrational signal, wherein the vibrational signal comprises data (e.g. audio data) to be conveyed from a primary UE (e.g. smart ring) to a user's ear through a user's hand and/or finger, are known.

One or more aspects of this disclosure relates to techniques for identifying a user in a transmission path.

A user's hand and/or finger may have vibrational properties (i.e. a frequency response function of a user's hand and/or finger may comprise one or more areas of low attenuation and one or more areas of high attenuation).

It will be understood that an area of low attenuation may designate an area with an attenuation equal to or lower than a first threshold. By contrast, an area of high attenuation may designate an area with an attenuation equal to or greater than a second threshold. The first threshold and the second threshold may be the same or different. The first threshold may be lower than the second threshold.

These vibrational properties may form a user biometric model capable of identifying the user. Such user biometric model is robust and may have an accuracy greater than 97%. The user biometric model may be decoupled from the behaviour of the user. That is, the user biometric model may be substantially the same regardless how firmly the user grips the primary UE or how strongly the user's hand and/or finger touches the secondary UE or solid object.

It will be understood that in this disclosure the term "attenuation" may be used as a synonymous of the terms "dampening" or "absorption".

Techniques for sending a vibrational signal from a primary UE (e.g. smart watch) to a solid object and receiving a reflected vibrational signal from the solid object to the primary UE through a user's hand and/or finger and for identifying a user based on the vibrational signal, the reflected vibrational signal and a stored user biometric model are known. The error rate may be lower than 2%.

One or more aspects of this disclosure relate to techniques for sending data comprising pre-check information. As will be apparent in the following, pre-check information may designate information sent before payload information to authenticate the primary UE. For example, when the primary UE is a smart phone and the secondary UE is a smart speaker, the pre-check information may comprise a secure key or a One Time Password (OTP). The payload information may comprise audio data.

Companies have been moving away from passwords towards secure keys Such secure keys may need to be sent from a primary UE (e.g. smartphone) to a secondary UE (e.g. lower-capability devices such as IoT devices or the like) as part of a pre-check or setup step.

C Service providers have been moving towards OTPs. Such OTPs may need to be sent from a primary UE to a secondary UE.

One or more aspects of this disclosure relate to techniques for identifying a user's grip.

It may be advantageous to identify the user's grip on a primary UE (e.g. smart phone) in some scenarios. Whilst the biometric model may be decoupled from the user's grip, performance may be particularly good (e.g. highest accuracy and/or lowest false rejection rate) when the user's grip at measurement time matches that at registration time. The user's grip on the primary UE may be identified acoustically.

One or more aspects of this disclosure provide techniques for outputting a vibrational signal, wherein the vibrational signal comprises data to be conveyed from a primary UE to a secondary UE through a user's hand and/or finger.

It will be understood that although this disclosure refers to a user's hand and/or finger, other user's body part could be used.

The primary UE may be holdable or wearable by a user. The primary UE may comprise a vibrational motor or other suitable actuator for generating a vibrational signal. The primary UE may be a smart phone, a smart watch or other. The primary UE may comprise a user interface to guide the user to modify a current grip of the primary UE and/or a current finger used to touch the secondary UE. The user interface may be operated via a screen, via a speaker or via other means. For example, the primary UE may use sensors to determine a current grip of the primary UE and/or a current finger used to touch the secondary UE. The primary UE may determine that the current grip of the primary UE and/or the current finger used to touch the secondary UE is inappropriate for sending the vibrational signal through the user's hand and/or finger. The primary UE may output visual and/or audio instructions to modify the current grip of the primary UE and/or the current finger used to touch the secondary UE.

The secondary UE may comprise an accelerometer, microphone, gyroscope, or any other suitable sensor for receiving a vibrational signal. The microphone or accelerometer may be operated by a firmware. The firmware may be configured to operate the microphone or accelerometer to detect high frequency signals, for example by overclocking an accelerometer (which typically can't resolve sensed motion above about 1.8 kHz). Examples of "high frequency signals" may be, for example, those in the range 20 Hz to 16 kHz, or between 100 Hz and 4 kHz. "High frequency signals" may refer to any range of signals that extends beyond the frequencies typically sensed by an accelerometer, e.g. any range that includes frequencies above about 1.8 kHz. The secondary UE may be a smart speaker, a smart door lock or other.

The primary UE may generate a vibrational signal comprising data to be conveyed from the primary UE to the secondary UE. For example, the primary UE may obtain (e.g. receive) data. The primary UE may modulate and/or encode the data into the vibrational signal.

The primary UE may modify the vibrational signal based on a user biometric model. For example, the primary UE may modify an amplitude and/or a frequency spectrum of the vibrational signal based on the user biometric model. The user biometric model may be locally stored at the primary UE or stored remotely (i.e. externally) from the primary UE. The user biometric model may comprise a frequency response function with one or more areas of low attenuation and one or more areas of high attenuation.

The primary UE may send the modified vibrational signal to the secondary UE.

The data may comprise a first data type and/or a second data type. The first data type may contain pre-check information. For example, the pre-check information may comprise a secure key, an OTP. The second data type may contain payload information. The payload information may comprise audio or video data.

In a scenario the data comprises both the first data type and the second data type. The modified vibrational signal may comprise a part conveying the first data type and another part conveying the second data type.

The primary UE may modify the part of the vibrational signal conveying the first data type based on the user biometric model. The UE may avoid modifying the other part of the vibrational signal conveying the second data type based on the user biometric model.

For example, the primary UE may modify the part of the vibrational signal conveying the first data type so that the part of the modified vibrational signal conveying the first data type is multiplied by the inverse of the frequency response function. In this way, the amplitude of the part of the vibrational signal conveying the first data type is decreased in the one or more frequency bands corresponding to the one or more areas of low attenuation of the user biometric model. The amplitude of the part of the vibrational signal conveying the first data type is increased in the one or more frequency bands corresponding to the one or more areas of high attenuation of the user biometric model. Additionally, The primary UE may modify the part of the vibrational signal conveying the first data type so that the amplitude of the part of the modified vibrational signal conveying the first data type may be lower than the amplitude of the other part of the modified vibrational signal conveying the second data type. It will be understood that the modifications may be perform in a single step or in multiple steps.

Alternatively or additionally, the frequency spectrum of the part of the modified vibrational signal conveying the first data type may be selected so that only frequency bands of the modified vibrational signal corresponding to areas of high attenuation of the user biometric model may be selected for sending the part of the modified vibrational signal conveying the first data type. By contrast, all frequency bands of the modified vibrational signal may be selected for sending the part of the modified vibrational signal conveying the second data type.

The primary UE may send the other part of the modified vibrational signal conveying the second data type only if the secondary UE receives the part of the modified vibrational signal conveying the first data type. For example, the primary UE may send the other part of the modified vibrational signal conveying the second data type only if the primary UE receives an acknowledgement of reception of the part of the modified vibrational signal conveying the first data type from the secondary UE.

This allow for the pre-check information to be securely sent to the secondary UE (i.e. with lower signal-to-noise ratio and therefore with lower chance to be detected and received by a malicious UE whilst being able to be detected and received by the secondary UE) and for the payload information to be reliably sent to the secondary UE (i.e. with higher signal-to-noise ratio and therefore with higher chance to be detected and received by the secondary UE).

The above mechanism operates by transforming the vibrational signal before it is sent through the user's hand badly enough that it is unintelligible unless the transformation is substantially inversed by a hand and/or finger with the expected frequency response function of the user biometric model.

This relies on the signal to noise ratio of the part of the modified vibrational signal conveying the first data type being low enough (the "noise" here being the frequency response of a hand). When transmitted through the expected user's hand and/or finger, the received modified vibrational signal is reasonably clear (albeit low amplitude) and the data comprised in the modified vibrational signal can be accurately extracted. When transmitted through an unexpected user's hand the noise is substantial enough that the received modified vibrational signal is unclear and data comprised in the modified vibrational signal cannot be accurately extracted.

In another scenario the data does not comprise the first data type and comprises the second data type. The primary UE may modify the part of the vibrational signal conveying the second data type based on the user biometric model.

The primary UE may modify the vibrational signal based on the user biometric model to enhance the security of the data received by the secondary UE. The primary UE may modify the vibrational signal based on the user biometric model so that the data comprised in the vibrational signal may only be extracted by the secondary UE if the modified vibrational signal is sent from the primary UE to the secondary UE through the user's hand and/or finger. The data comprised in the vibrational signal may not be extracted by the secondary UE if the modified vibrational signal is sent from the primary UE to the secondary UE through another user's hand and/or finger. Additionally or alternatively, the data comprised in the vibrational signal may not be extracted by the secondary UE if the modified vibrational signal is sent from the primary UE to the secondary UE through no user's hand and/or finger at all (i.e. the primary UE is in direct contact with the secondary UE).

To this end, the primary UE may select all frequency bands of the vibrational signal for sending the modified vibrational signal. The primary UE may reduce the amplitude of one or more frequency bands of the vibrational signal corresponding to the one or more areas of low attenuation of the user biometric model.

Alternatively, the primary UE may select only one or more frequency bands of the vibrational signal corresponding to the one or more areas of high attenuation of the user biometric model for sending the modified vibrational signal.

In this way, the modified vibrational signal is made more difficult to detect and receive by a malicious UE whilst being able to be detected and received by the secondary UE. The amplitude of the modified vibrational signal may be just barely enough to be detectable.

It will be understood that this may be used by the primary UE for sending the part of the modified vibrational signal conveying the first data type with the pre-check information (i.e. secure key or OTP). The pre-check information may be sent at a low amplitude and/or using frequency bands corresponding to areas of high attenuation. Correct extraction of the pre-check information by the secondary UE may provide evidence that a registered user is present in the transmission path between the primary UE and the secondary UE and expect the modified vibrational signal to be detected and received. Indeed, the low amplitude part of the modified vibrational signal conveying the first data type with the pre-check information would otherwise not be expected to be detected and received.

As explained above the data conveyed by the modified vibrational signal may not be obtained by the secondary UE unless the modified vibrational signal is sent from the primary UE to the secondary UE through the user's hand and/or finger. The data comprise in the modified vibrational signal may not be extracted by the secondary UE if the modified vibrational signal is sent from the primary UE to the secondary UE through another user's hand and/or finger. Additionally or alternatively, the data comprised in the modified vibrational signal may not be extracted by the secondary UE if the modified vibrational signal is sent from the primary UE to the secondary UE through no user's hand and/or finger at all (i.e. the primary UE is in direct contact with the secondary UE).

The primary UE may modify the vibrational signal based on the user biometric model to enhance the quality of the data received by the secondary UE. The primary UE may modify the amplitude of the vibrational signal based on the user biometric model so that the modified vibrational signal compensates for the distortion introduced by the user's hand and/or finger.

To this end, the primary UE may select all frequency bands of the vibrational signal for sending the modified vibrational signal. The primary UE may increase the amplitude of one or more frequency bands of the vibrational signal corresponding to the one or more areas of high attenuation of the user biometric model. In this way, the modified vibrational signal received by the secondary UE may more closely resemble the "pure" or "undistorted" vibrational signal originally generated by the primary UE.

The primary UE may modify the vibrational signal based on the user biometric model to enhance the reliability of the data to be detected and received by the secondary UE. The primary UE may modify the amplitude of the vibrational signal based on the user biometric model so that the modified vibrational signal is proofed against the distortion introduced by the user's hand and/or finger (i.e. the distortion introduced by the user's hand and/or finger is minimal).

To this end, the primary UE may select only one or more frequency bands of the vibrational signal corresponding to the one or more areas of low attenuation of the user biometric model for sending.

The primary UE may receive the user biometric model or may build the user biometric model.

In an example, the primary UE may instruct (e.g. guide via a user interface) the user to grip the primary UE and touch the secondary UE in a desired manner. The primary UE may measure the grip (e.g. acoustically). An example of an acoustic grip measurement is one in which carefully designed sounds are emitted from a device's speaker and detected at a microphone; owing to different distortions caused by different user grips, it is then possible to classify the current user grip from measurements of the received sounds.

In this way, the grip may be coupled to the user biometric model. Alternatively, the primary UE may not measure the grip. The primary UE may send a calibration vibrational signal to the secondary UE while the user grips the primary UE and touches the secondary UE. The calibration vibrational signal may span across a range of frequency bands. The primary UE may receive feedback from the secondary UE including a vibrational signal received by the secondary UE. The primary UE may compare the calibration vibrational signal to the vibrational signal received by the secondary UE to build the user biometric model.

In another example, the primary UE may instruct (e.g. guide via a user interface) the user to grip the primary UE and touch a solid object. The primary UE may measure the grip (e.g. acoustically). In this way, the grip may be coupled to the user biometric model. Alternatively, the primary UE may not measure the grip. The solid object may be used as a reflector instead of the secondary UE. The primary UE may send a calibration vibrational signal while the user grips the primary UE and touches the solid object. The calibration vibrational signal may span across a range of frequency bands. The primary UE may receive a vibrational signal reflected by the solid object. The primary UE may compare the calibration vibrational signal to the vibrational signal reflected by the solid object to build the user biometric model.

In another example, the primary UE may instruct (e.g. guide via a user interface) the user to place the primary UE on a solid surface (e.g. table) and to grip and subsequently release the primary UE. The primary UE may measure the grip (e.g. acoustically). In this way, the grip may be coupled to the user biometric model. Alternatively, the primary UE may not measure the grip. The primary UE may send a calibration vibrational signal while the user places the primary UE on the solid surface and while the user grips and subsequently releases the primary UE. The calibration vibrational signal may span across a range of frequency bands. The primary UE may receive a vibrational signal reflected by the surface. The primary UE may compare the calibration vibrational signal to the vibrational signal reflected by the surface to build the user biometric model.

In the above examples, the primary UE may instruct (e.g. guide via a user interface) the user to adjust the grip and/or change the finger used to touch the secondary UE or solid object after building a first iteration of the user biometric model and may build a second iteration of the user biometric model. The primary UE may build a more accurate user biometric model based the first iteration of the user biometric model and the second iteration of the user biometric model.

The primary UE may take an action after sending the modified vibrational signal (e.g. select payment method or select card).

The primary UE may take different action (e.g. select different payment methods or select different card) depending whether the user touched the secondary UE with a first finger or a second finger while the modified vibrational signal was sent to the secondary UE.

The primary UE may determine whether the user touched the secondary UE with the first finger or the second finger while the modified vibrational signal was sent to the secondary UE.

To this end, the primary UE may cycle through user biometric model associated with the fingers to modify the vibration signal and send the modified vibrational signal. The primary UE may modify the vibrational signal based on a first user biometric model associated with the first finger. The primary UE may send the modified vibrational signal to the secondary UE. The primary UE may modify the vibrational signal based on a second user biometric model associated with the second finger. The primary UE may resend the modified vibrational signal to the secondary UE. The primary UE may determine that the secondary UE took an action. The primary UE may determine whether the user touched the other apparatus with the first finger or the second finger while the modified vibrational signal was sent to the secondary UE based on whether the secondary UE took the action after the vibrational signal was modified based on the first user biometric model and the modified vibrational signal was sent or after the vibrational signal was modified based on the second user biometric model and the modified vibrational signal was sent. That is, the timing of the action taken by the secondary UE is used to determined whether the user touched the other apparatus with the first finger or the second finger while the modified vibrational signal was sent to the secondary UE.

Alternatively, the secondary UE may determine whether the user touched the other apparatus with the first finger or the second finger while the modified vibrational signal was received by the secondary UE. The primary UE may receive a feedback from the secondary UE indicating whether the user touched the secondary UE with the first finger or the second finger while the modified vibrational signal was received by the secondary UE. The feedback may comprise a waveform or data that would allow the primary UE to know directly which finger has been used.

For example, the primary UE may add metadata to each transmission to differentiate it from the others (e.g. a unique number, or a label like "index finger"). The secondary UE may then report this to the primary UE. In a more basic approach, no metadata is required and the secondary UE simply reports that a specific attempt (e.g. the third attempt) was successful (with the primary UE then checking which model was used for the third attempt).

The feedback may be a vibrational signal from the secondary UE to the primary UE. Alternatively, the feedback may be a signal through any other channel (e.g. Bluetooth, audio, infra red, etc.).

The primary UE may take a first action when the user touched the secondary UE with the first finger and a second action when the user touched the second UE with the second finger.

It will be understood that the above may be generalized to the primary UE taking different actions depending on whether the user uses a first anatomical configuration or a second anatomical configuration. For example, the primary UE may take different action depending on whether the user uses a first grip or a second grip while the modified vibrational signal was sent to the secondary UE. This is because different anatomical configurations can be associated with different biometric models.

In an implementation, the primary UE may determine the likelihood that the modified vibrational signal has been received by the secondary UE. The likelihood that the modified vibrational signal has been received by the secondary UE may be determined based on an amplitude of the modified vibrational signal sent by the primary UE, an amplitude of the modified vibrational signal received by the secondary and/or the user biometric model.

The primary UE may determine that the likelihood that the modified vibrational signal has been received by the secondary UE is lower than a threshold. The primary UE may modify the vibrational signal based on the user biometric model to increase the likelihood that the modified vibrational signal will be received by the secondary UE. The primary UE may resend the modified vibrational signal to the secondary UE. This may be useful when the quality of the data received by the secondary UE should be enhanced and/or the reliability of the reception of the data by the secondary UE should be enhanced.

Alternatively, the primary UE may determine that the likelihood that the modified vibrational signal has been received by the secondary UE is greater than a threshold. The primary UE may modify the vibrational signal based on the user biometric model to reduce the likelihood that the modified vibrational signal will be received by the secondary UE. The primary UE may resend the modified vibrational signal to the secondary UE. This may be useful when the security of the data received by the secondary UE should be enhanced.

In an implementation, the primary UE may instruct (e.g. guide via a user interface) the user to adjust a current grip or change a current finger touching the secondary UE so that the current grip or current finger is the same as a previous grip or previous finger used to build the user biometric model. In this way, the modified vibrational signal may be sent to the secondary UE in an optimal manner.

The primary UE may first determine that the current grip or current finger touching the secondary UE is different from the previous grip or the previous finger used to build the user biometric model. For example, the primary UE may measure the current grip (e.g. acoustically).

If the primary UE determines that the current grip or current finger touching the secondary UE is the same as the previous grip or the previous finger used to build the user biometric model, the primary UE will not instruct the user to adjust a current grip or change a current finger touching the secondary UE.

Alternatively, the primary UE may not first determine that the current grip or current finger touching the secondary UE is different from the previous grip or the previous finger used to build the user biometric model. The primary UE may for example assume that the current grip or current finger touching the secondary UE is different from the previous grip or the previous finger used to build the user biometric model. In another implementation, the primary UE determines that the current grip or current finger touching the secondary UE is different from the previous grip or the previous finger used to build the user biometric model, the primary UE may build a new user biometric model and may store the new user biometric model for subsequent use.

Figure 2:
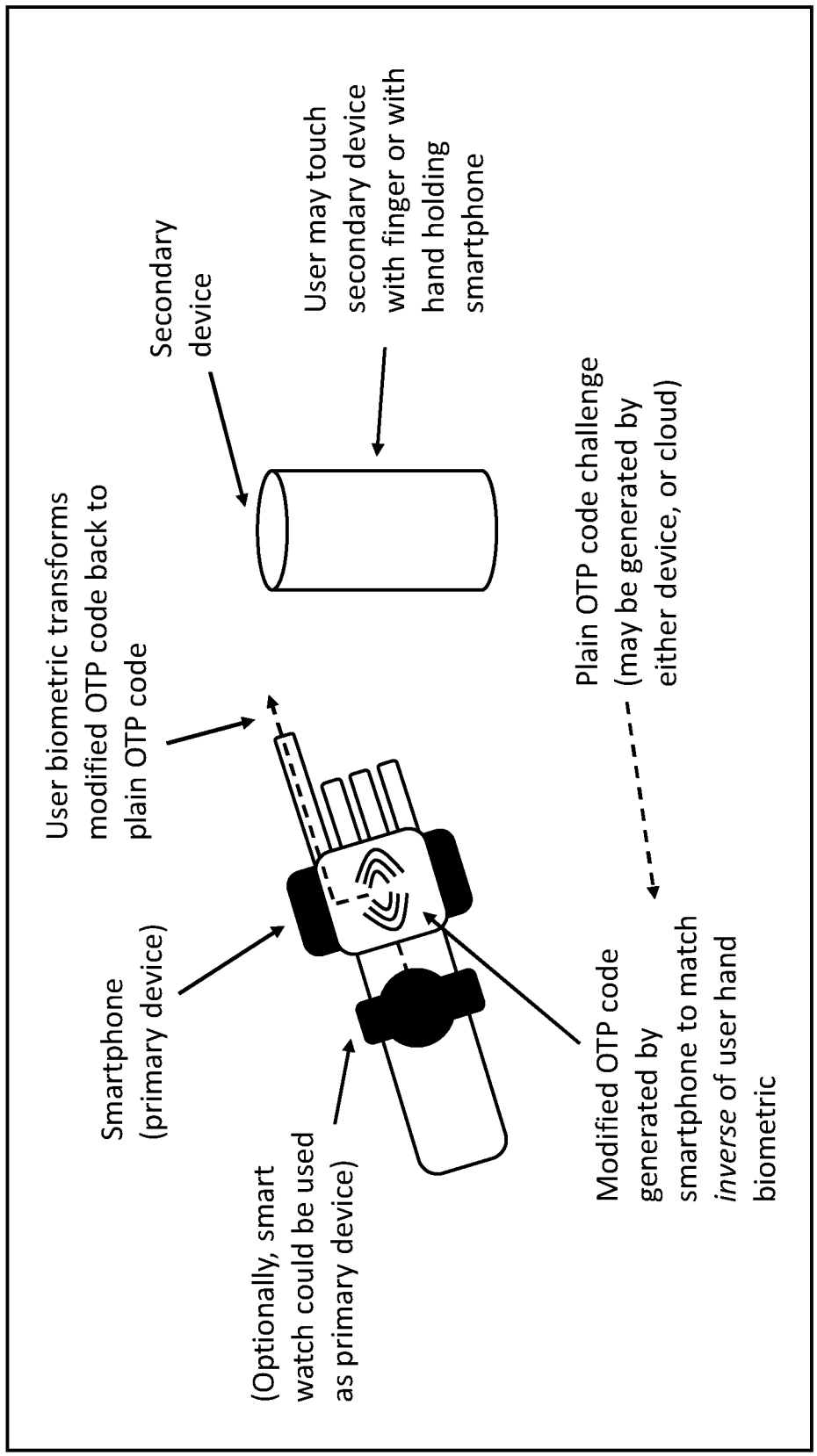
FIG. 2 shows a schematic representation of an apparatus outputting a modified vibrational signal.

FIG. 2 shows a schematic representation of a primary UE (e.g. smart watch or smart phone) and a secondary UE (e.g. smart speaker). The primary UE may receive an OTP. The primary UE may generate a vibrational signal conveying the OTP. The primary UE may modify the vibrational signal based on a user biometric model. The primary UE may modify an amplitude and/or a frequency spectrum of the vibrational signal. The primary UE may send the modified vibrational signal to the secondary UE.

Here, the primary UE may modify the vibrational signal based on the user biometric model to enhance the security of the OTP received by the secondary UE. The primary UE may select all frequency bands of the vibrational signal for sending the modified vibrational signal. The primary UE may reduce the amplitude of one or more frequency bands of the vibrational signal corresponding to the one or more areas of low attenuation. Alternatively, the primary UE may select only one or more frequency bands of the vibrational signal corresponding to the one or more areas of high attenuation for sending the modified vibrational signal.

In practice, the techniques described above may be implemented in a registration phase and/or a use phase.

Figure 3:
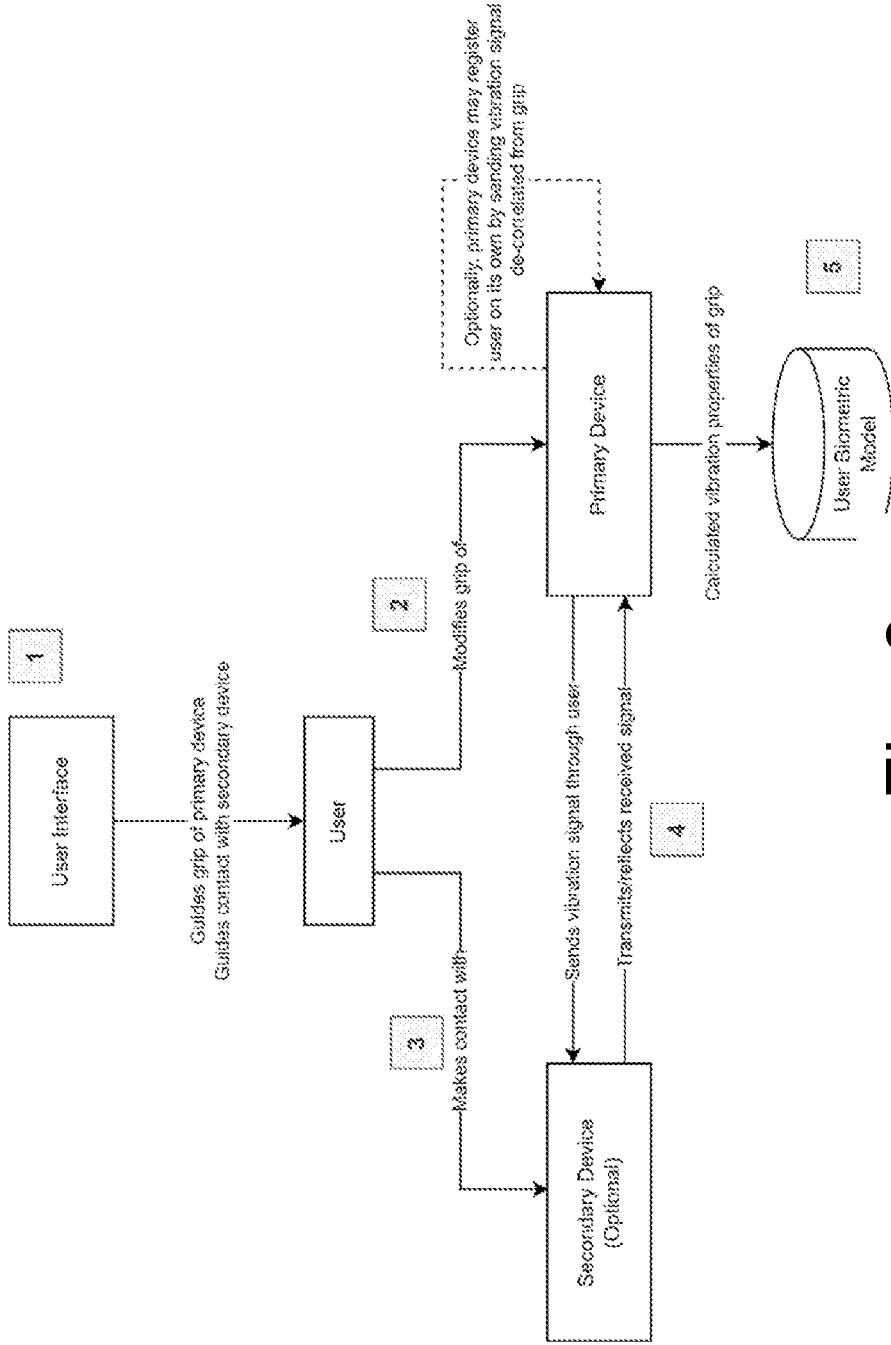
FIG. 3 shows a flow diagram of an example of a registration phase.

FIG. 3 shows a flow diagram of an example of a registration phase. A user or an existing may need to register to be part of a vibrational biometric system via the primary UE. The user may be a new user or an existing user.

In step 1, the primary UE may or may not measure a current grip. The primary UE may instruct (e.g. guide via a user interface) the user to modify the current grip and/or a current finger used to touch the secondary UE so that that the user biometric model subsequently built is optimal.

In step 2, the user may modify the current grip and/or current finger as instructed. The primary UE may measure the current grip so that the user biometric model is correlated to the current grip. Alternatively, the primary UE may avoid measuring the grip so that the user biometric model is de-correlated from the current grip.

In step 3, the user may modify the current finger used to touch the secondary UE as instructed.

In step 4, the primary UE may send a calibration vibrational signal to the secondary UE while the user grips the primary UE and touches the secondary UE. The calibration vibrational signal may span across a range of frequency bands. The primary UE may receive feedback from the secondary UE including a vibrational signal received by the secondary UE. The primary UE may compare the calibration vibrational signal to the vibrational signal received by the secondary UE to build the user biometric model.

In step 5, the user may store the user biometric model in a user biometric model storage. The user biometric model storage may be internal or external to the primary UE.

Figure 4:
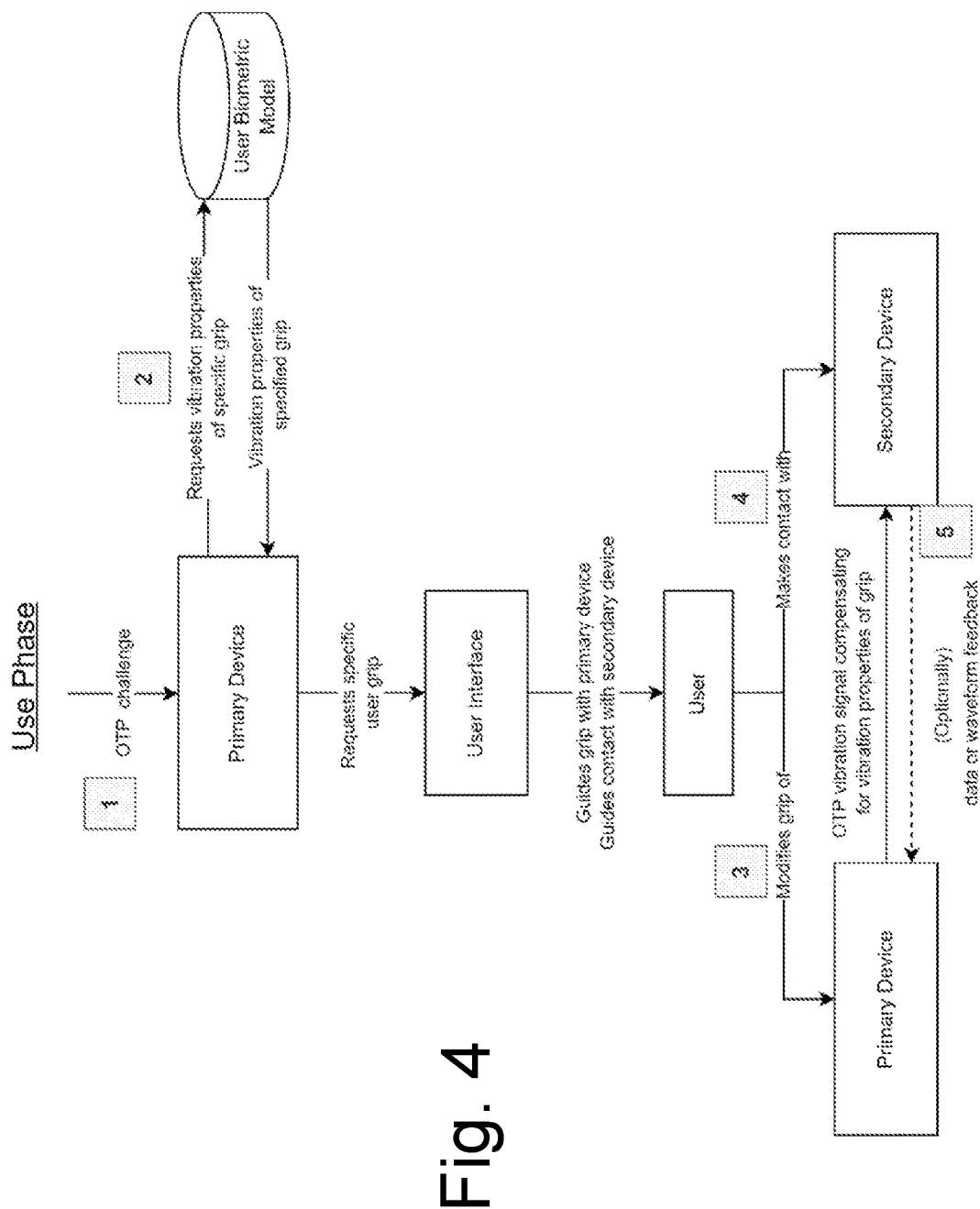
FIG. 4 shows a flow diagram of an example of a use phase.

FIG. 4 shows a flow diagram of an example of a use phase.

In step 1, the primary UE may determine a requirement to send data securely and/or reliably. The requirement may be determined based on a type of data received by the primary UE. The data may comprise an OTP. The primary UE may generate a vibrational signal conveying the data.

In step 2, the primary UE may request the user biometric model from the user biometric model storage. The primary UE may receive the user biometric model from the user biometric model storage. The primary UE may or may not determine a current grip. The primary UE may instruct (e.g. guide via a user interface) the user to modify the current grip and/or current finger used to touch the secondary UE so that so that the current grip or current finger is the same as the previous grip or previous finger used to build the user biometric model in the registration phase.

In step 3, the user may modify the current grip as instructed.

In step 4, the user may modify the current finger used to touch the secondary UE as instructed.

In step 5, the primary UE may generate a vibrational signal conveying the OTP. The primary UE may modify the vibrational signal based on the user biometric model.

Here, the primary UE may modify the vibrational signal based on the user biometric model to enhance the quality of the OTP received by the secondary UE. The primary UE may modify the amplitude of the vibrational signal based on the user biometric model so that the modified vibrational signal compensates the distortion introduced by the user's hand and/or finger. The primary UE may select all frequency bands of the vibrational signal for sending the modified vibrational signal. The primary UE may increase the amplitude of one or more frequency bands of the vibrational signal corresponding to the one or more areas of high attenuation.

The primary UE may send the modified vibrational signal to the secondary UE while the user grips the primary UE and touches the secondary UE.

The secondary UE may send feedback to the primary UE. The feedback may comprise the OTP. Alternatively, the feedback may comprise the OTP and the modified vibration signal. The primary UE may use the OTP to infer that the user in the transmission path between the primary UE and the secondary UE is a registered user. The primary UE may authenticate the user. The primary UE may authorise further data to be sent between the primary UE and the secondary UE. The primary UE may use the modified vibration signal to adjust (i.e. refine) the user biometric model.

Alternatively, the secondary UE may send feedback to a third party (e.g. a payment server). The third party may use the OTP to infer that the user in the transmission path between the primary UE and the secondary UE is a registered user. The third party may authenticate the user. The third party may authorise further data to be sent between the primary UE and the secondary UE.

Figure 5:
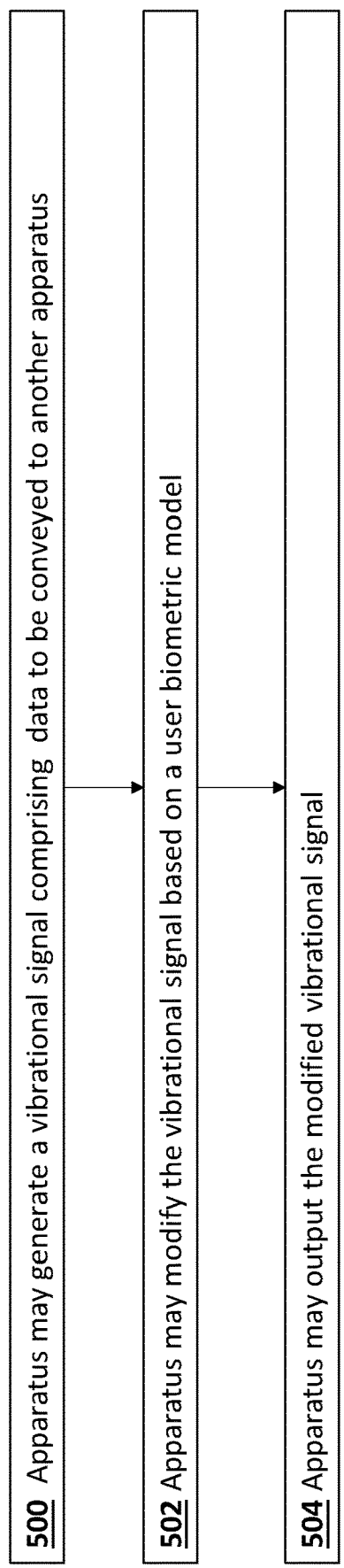
FIG. 5 shows a block diagram of a method performed by a primary user equipment for sending a modified vibrational signal to a secondary user equipment based on a user biometric model.

FIG. 5 shows a block diagram of a method performed by an apparatus (e.g. a primary UE) for sending a modified vibrational signal to another apparatus (e.g. a secondary UE).

In step 500, an apparatus may generating a vibrational signal comprising data to be conveyed to another apparatus.

In step 502, the apparatus may modify the vibrational signal based on a user biometric model.

In step 504, the apparatus may output the modified vibrational signal. Generating the vibrational signal conveying data may comprise: obtaining data; and modulating and/or encoding the data into the vibrational signal.

Modifying the vibrational signal based on a user biometric model may comprise: modifying an amplitude and/or a frequency spectrum of the vibrational signal.

The data may comprise a first data type and a second data type. Modifying the vibrational signal based on a user biometric model may comprise: modifying a part of the vibrational signal conveying the first data type based on a user biometric model; and not modifying another part of the vibrational signal conveying the second data type based on a user biometric model.

The first data type may contain pre-check information. The second data type may contain payload information.

The data may comprise a second data type. Modifying the vibrational signal based on a user biometric model may comprise: modifying a part of the vibrational signal conveying the second data type based on a user biometric model.

The user biometric model may be a frequency response function with one or more areas of low attenuation and one or more areas of high attenuation.

Modifying the vibrational signal based on a user biometric model may comprise: selecting all frequency bands of the vibrational signal for outputting all frequency bands of the vibrational signal; and reducing the amplitude of one or more frequency bands of the vibrational signal corresponding to the one or more areas of low attenuation.

Reducing the amplitude of one or more frequency bands of the vibrational signal corresponding to the one or more areas of low attenuation may comprise only reducing the amplitude of the one or more frequency bands of the vibrational signal corresponding to the one or more areas of low attenuation.

Modifying the vibrational signal based on a user biometric model may comprise: only selecting one or more frequency bands of the vibrational signal corresponding to the one or more areas of high attenuation for outputting only the one or more frequency bands of the vibrational signal corresponding to the one or more areas of high attenuation.

Modifying the vibrational signal based on a user biometric model may comprise: selecting all frequency bands of the vibrational signal for outputting all frequency bands of the vibrational signal; and increasing the amplitude of one or more frequency bands of the vibrational signal corresponding to the one or more areas of high attenuation.

Modifying the vibrational signal based on a user biometric model may comprise: selecting only one or more frequency bands of the vibrational signal corresponding to the one or more areas of low attenuation for outputting.

The apparatus may receive the user biometric model; or build the user biometric model.

Building the user biometric model may comprise: sending a calibration vibrational signal to the other apparatus while the user grips the apparatus and touches the other apparatus; receiving feedback from the other apparatus including a vibrational signal received by the other apparatus; and comparing the calibration vibrational signal to the vibrational signal received by the other apparatus to build the user biometric model.

Building the user biometric model may comprise: sending a calibration vibrational signal while the user grips the apparatus and touches a solid object; and receiving a vibrational signal reflected by the solid object; and comparing the calibration vibrational signal to the vibrational signal reflected by the solid object to build the user biometric model.

Building the user biometric model may comprise: sending a calibration vibrational signal while the user places the apparatus on a solid surface and while the user grips and subsequently releases the apparatus; and receiving a vibrational signal reflected by the solid surface; and comparing the calibration vibrational signal to the vibrational signal reflected by the solid surface to build the user biometric model.

Building the user biometric model may comprise: instructing the user to adjust the grip and/or change the finger used to touch the other apparatus or solid object.

The apparatus may determine whether the user is touching the other apparatus with a first finger configuration or a second finger configuration and/or whether the user is using a first grip or a second grip while the modified vibrational signal was sent to the other apparatus. The apparatus may take a first action when the user touched the other apparatus with the first finger configuration or used the first grip and a second action when the user touched the other apparatus with the second finger configuration or used the second grip.

A finger configuration may comprise one or more fingers.

The apparatus may modify the vibrational signal based on a first user biometric model associated with the first finger configuration or first grip. The apparatus may send the modified vibrational signal to another apparatus. The apparatus may modify the vibrational signal based on a second user biometric model associated with the second finger configuration or second grip. The apparatus may resend the modified vibrational signal to the other apparatus. The apparatus may determine that the other apparatus took an action. The apparatus may determine whether the user touched the other apparatus with the first finger configuration or the second finger configuration or whether the user used a first grip or a second grip while the modified vibrational signal was sent to the other apparatus based on whether the other apparatus took the action after the vibrational signal was modified based on the first user biometric model and the modified vibrational signal was sent or after the vibrational signal was modified based on the second user biometric model and the modified vibrational signal was sent.

The apparatus may receive a feedback from the other apparatus indicating whether the user touched the other apparatus with the first finger configuration or the second finger configuration while the modified vibrational signal was received by the other apparatus.

The apparatus may determine the likelihood that the modified vibrational signal has been received by the other apparatus based on: an amplitude of the modified vibrational signal sent by the apparatus, an amplitude of the modified vibrational signal received by the other apparatus, and the user biometric model.

The apparatus may determine that the likelihood that the modified vibrational signal has been received by the other apparatus is lower or greater than a threshold. The apparatus may modify the vibrational signal based on the user biometric model to increase or decrease the likelihood that the modified vibrational signal will be received by the other apparatus based on the determination. The apparatus may re-output the modified vibrational signal to the other apparatus.

The apparatus may instruct a user to adjust a current grip or change a current finger configuration touching the other apparatus so that the current grip or current finger is the same as a previous grip or previous finger used to build the user biometric model.

The apparatus may determine that the current grip or current finger configuration touching the other apparatus is different from the previous grip or the previous finger configuration used to build the user biometric model.

The apparatus may be holdable or wearable by a user.

The apparatus may comprise a vibration motor configured to send the modified vibrational signal; and the other apparatus may comprise a microphone and/or an accelerometer configured to receive the modified vibrational signal.

FIG. 6 shows a schematic representation of non-volatile memory media 6000 storing instructions and/or parameters which when executed by a processor allow the processor to perform one or more of the steps of the method of FIG. 5.

It is noted that while the above describes example embodiments, there are several variations and modifications which may be made to the disclosed solution without departing from the scope of the present invention.

It will be understood that the primary UE and/or the secondary UE are not necessarily part of a communication system. As discussed above, the primary UE is not necessarily a smart phone and/or the secondary UE is not necessarily a smart phone.

The primary UE may be a smart watch or other. The secondary UE may be a smart speaker, a smart door or other.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 5, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, or optical media such as for example DVD and the data variants thereof, or CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory storing instructions that, when executed by the at least one processor, cause the apparatus at least to:
generate a vibrational signal comprising data to be conveyed to another apparatus;
modify the vibrational signal based on a user biometric model; and
output the modified vibrational signal,
wherein:
the user biometric model is a frequency response function with one or more areas of low attenuation and one or more areas of high attenuation; and
modifying the vibrational signal based on the user biometric model comprises at least one of:
(i) selecting all frequency bands of the vibrational signal for outputting all frequency bands of the vibrational signal; and reducing an amplitude of one or more frequency bands of the vibrational signal corresponding to the one or more areas of low attenuation;
(ii) only selecting one or more frequency bands of the vibrational signal corresponding to the one or more areas of high attenuation for outputting only the one or more frequency bands of the vibrational signal corresponding to the one or more areas of high attenuation;
(iii) selecting all frequency bands of the vibrational signal for outputting all frequency bands of the vibrational signal; and increasing the amplitude of one or more frequency bands of the vibrational signal corresponding to the one or more areas of high attenuation; or (iv) only selecting one or more frequency bands of the vibrational signal corresponding to the one or more areas of low attenuation for outputting only the one or more frequency bands of the vibrational signal corresponding to the one or more areas of low attenuation.

2. The apparatus of claim 1, wherein modifying the vibrational signal based on the user biometric model comprises:
modifying the amplitude and/or a frequency spectrum of the vibrational signal.

3. The apparatus of claim 1, wherein:
the data comprises a first data type and a second data type; and
modifying the vibrational signal based on the user biometric model comprises:
modifying a part of the vibrational signal conveying the first data type based on the user biometric model; and
not modifying another part of the vibrational signal conveying the second data type based on the user biometric model.

4. The apparatus of claim 1, wherein:
the data comprises a second data type; and
modifying the vibrational signal based on the user biometric model comprises modifying a part of the vibrational signal conveying the second data type based on the user biometric model.

5. The apparatus of claim 4, wherein the user biometric model is a frequency response function with one or more areas of low attenuation and one or more areas of high attenuation.

6. The apparatus of claim 5, wherein modifying the vibrational signal based on the user biometric model comprises:
selecting all frequency bands of the vibrational signal for outputting all frequency bands of the vibrational signal; and
reducing the amplitude of one or more frequency bands of the vibrational signal corresponding to the one or more areas of low attenuation.

7. The apparatus of claim 5, wherein modifying the vibrational signal based on the user biometric model comprises only selecting one or more frequency bands of the vibrational signal corresponding to the one or more areas of high attenuation for outputting only the one or more frequency bands of the vibrational signal corresponding to the one or more areas of high attenuation.

8. The apparatus of claim 5, wherein modifying the vibrational signal based on the user biometric model comprises:
selecting all frequency bands of the vibrational signal for outputting all frequency bands of the vibrational signal; and
increasing the amplitude of one or more frequency bands of the vibrational signal corresponding to the one or more areas of high attenuation.

9. The apparatus of claim 5, wherein modifying the vibrational signal based on the user biometric model comprises selecting only one or more frequency bands of the vibrational signal corresponding to the one or more areas of low attenuation for outputting.

10. The apparatus of claim 1, wherein the instructions, when executed by the at least one processor, further cause the apparatus at least to:
determine at least one of:
whether a user is touching the other apparatus with a first finger configuration or a second finger configuration; or
whether the user is using a first grip or a second grip while the modified vibrational signal was sent to the other apparatus; and
take a first action when the user touched the other apparatus with the first finger configuration or used the first grip and a second action when the user touched the other apparatus with the second finger configuration or used the second grip.

11. The apparatus of claim 1, wherein the instructions, when executed by the at least one processor, further cause the apparatus at least to determine the likelihood that the modified vibrational signal has been received by the other apparatus based on an amplitude of the modified vibrational signal sent by the apparatus, an amplitude of the modified vibrational signal received by the other apparatus and determined from feedback provided by the other apparatus, and the user biometric model.

12. The apparatus of claim 11, wherein the instructions, when executed by the at least one processor, further cause the apparatus at least to:
   determine that the likelihood that the modified vibrational signal has been received by the other apparatus is lower or greater than a threshold;
   modify the vibrational signal based on the user biometric model to increase or decrease the likelihood that the modified vibrational signal will be received by the other apparatus based on the determination; and
   re-output the modified vibrational signal to the other apparatus.

13. The apparatus of claim 1, wherein the instructions, when executed by the at least one processor, further cause the apparatus at least to instruct a user to adjust a current grip or change a current finger configuration touching the other apparatus so that the current grip or current finger is the same as a previous grip or previous finger used to build the user biometric model.

14. A method comprising:
   generating a vibrational signal comprising data to be conveyed to another apparatus;
   modifying the vibrational signal based on a user biometric model; and
   outputting the modified vibrational signal,
   wherein:
      the user biometric model is a frequency response function with one or more areas of low attenuation and one or more areas of high attenuation; and
      modifying the vibrational signal based on the user biometric model comprises at least one of:
         (i) selecting all frequency bands of the vibrational signal for outputting all frequency bands of the vibrational signal; and reducing an amplitude of one or more frequency bands of the vibrational signal corresponding to the one or more areas of low attenuation;
         (ii) only selecting one or more frequency bands of the vibrational signal corresponding to the one or more areas of high attenuation for outputting only the one or more frequency bands of the vibrational signal corresponding to the one or more areas of high attenuation;
         (iii) selecting all frequency bands of the vibrational signal for outputting all frequency bands of the vibrational signal; and increasing the amplitude of one or more frequency bands of the vibrational signal corresponding to the one or more areas of high attenuation; or
         (iv) only selecting one or more frequency bands of the vibrational signal corresponding to the one or more areas of low attenuation for outputting only the one or more frequency bands of the vibrational signal corresponding to the one or more areas of low attenuation.

15. A non-transitory computer readable medium comprising program instructions stored thereon for performing at least the following:
   generating a vibrational signal comprising data to be conveyed to another apparatus;
   modifying the vibrational signal based on a user biometric model; and
   outputting the modified vibrational signal,
   wherein:
      the user biometric model is a frequency response function with one or more areas of low attenuation and one or more areas of high attenuation; and
      modifying the vibrational signal based on the user biometric model comprises at least one of:
         (i) selecting all frequency bands of the vibrational signal for outputting all frequency bands of the vibrational signal; and reducing an amplitude of one or more frequency bands of the vibrational signal corresponding to the one or more areas of low attenuation;
         (ii) only selecting one or more frequency bands of the vibrational signal corresponding to the one or more areas of high attenuation for outputting only the one or more frequency bands of the vibrational signal corresponding to the one or more areas of high attenuation;
         (iii) selecting all frequency bands of the vibrational signal for outputting all frequency bands of the vibrational signal; and increasing the amplitude of one or more frequency bands of the vibrational signal corresponding to the one or more areas of high attenuation; or
         (iv) only selecting one or more frequency bands of the vibrational signal corresponding to the one or more areas of low attenuation for outputting only the one or more frequency bands of the vibrational signal corresponding to the one or more areas of low attenuation.

\* \* \* \* \*